(12) United States Patent
Bahattab

(10) Patent No.: US 7,664,108 B2
(45) Date of Patent: Feb. 16, 2010

(54) ROUTE ONCE AND CROSS-CONNECT MANY

(76) Inventor: Abdullah Ali Bahattab, 29 Muhammad Al-samman Street, Jeddah (SA)

( * ) Notice: Subject to any disclaimer, the term of this patent is extended or adjusted under 35 U.S.C. 154(b) by 266 days.

(21) Appl. No.: 11/973,403

(22) Filed: Oct. 9, 2007

(65) Prior Publication Data
US 2008/0084884 A1   Apr. 10, 2008

Related U.S. Application Data

(60) Provisional application No. 60/850,590, filed on Oct. 10, 2006.

(51) Int. Cl.
    *H04L 12/28* (2006.01)
(52) U.S. Cl. .................... 370/389; 709/242
(58) Field of Classification Search .......... None
    See application file for complete search history.

(56) References Cited

U.S. PATENT DOCUMENTS

| | | | | |
|---|---|---|---|---|
| 6,108,708 | A * | 8/2000 | Iwata | 709/238 |
| 6,381,638 | B1 * | 4/2002 | Mahler et al. | 709/220 |
| 6,934,283 | B1 * | 8/2005 | Warner | 370/380 |
| 7,139,278 | B2 | 11/2006 | Gibson et al. | |
| 2002/0150114 | A1 * | 10/2002 | Sainomoto et al. | 370/402 |
| 2004/0139236 | A1 | 7/2004 | Mehra et al. | |
| 2004/0249887 | A1 * | 12/2004 | Garcia-Martin et al. | 709/204 |
| 2005/0201357 | A1 * | 9/2005 | Poyhonen | 370/352 |
| 2006/0002304 | A1 | 1/2006 | Ashwood-Smith | |
| 2006/0013211 | A1 * | 1/2006 | Deerman et al. | 370/389 |
| 2006/0015643 | A1 * | 1/2006 | Orava et al. | 709/238 |
| 2006/0031536 | A1 * | 2/2006 | Eydelman et al. | 709/228 |
| 2006/0080380 | A1 * | 4/2006 | Aizu et al. | 709/203 |
| 2006/0193323 | A1 * | 8/2006 | Lee | 370/392 |
| 2007/0025348 | A1 * | 2/2007 | Nakashima et al. | 370/389 |
| 2007/0133406 | A1 * | 6/2007 | Vasseur | 370/230 |
| 2007/0136413 | A1 * | 6/2007 | Ishikawa et al. | 709/200 |
| 2007/0177622 | A1 * | 8/2007 | Kim | 370/428 |
| 2008/0280623 | A1 * | 11/2008 | Danne et al. | 455/453 |

OTHER PUBLICATIONS

RFC3261—SIP: Session Initiation Protocol, Network Working Group, Request for Comments: 3261, J. Rosenberg dynamicsoft, H. Schulzrinne Columbia U., G. Camarillo Ericsson A., Johnston WorldCom, J. Peterson Neustar, R. Sparks dynamicsoft, M. Handley ICIR, E. Schooler AT&T,Jun. 2002.*
Vasu Jolly & Shahram Latifi, "An Overview Of MPLS And Constraint Based Routing," Proceedings of the International Conference on Parallel . . . , pp. 1739-1745, Jun. 24, 2002.

* cited by examiner

*Primary Examiner*—Pankaj Kumar
*Assistant Examiner*—Ajay P Cattungal
(74) *Attorney, Agent, or Firm*—Aziz M. Ahsan; Ahsan & Associates, PLLC

(57) ABSTRACT

The present invention relates generally to high-speed packet forwarding (switching/routing) system such as the present IP (Internet Protocol). More particularly, the invention encompasses a protocol that includes having the capabilities of high-speed IP packet forwarding to over come network delays. The invention further includes a protocol that allows for an easy and transparent implementation on current IP networks or any packet switching system/device so that one can route once (at a certain level) and cross-connect many (at a lower layer) (ROACM).

20 Claims, 3 Drawing Sheets

FIG. 1
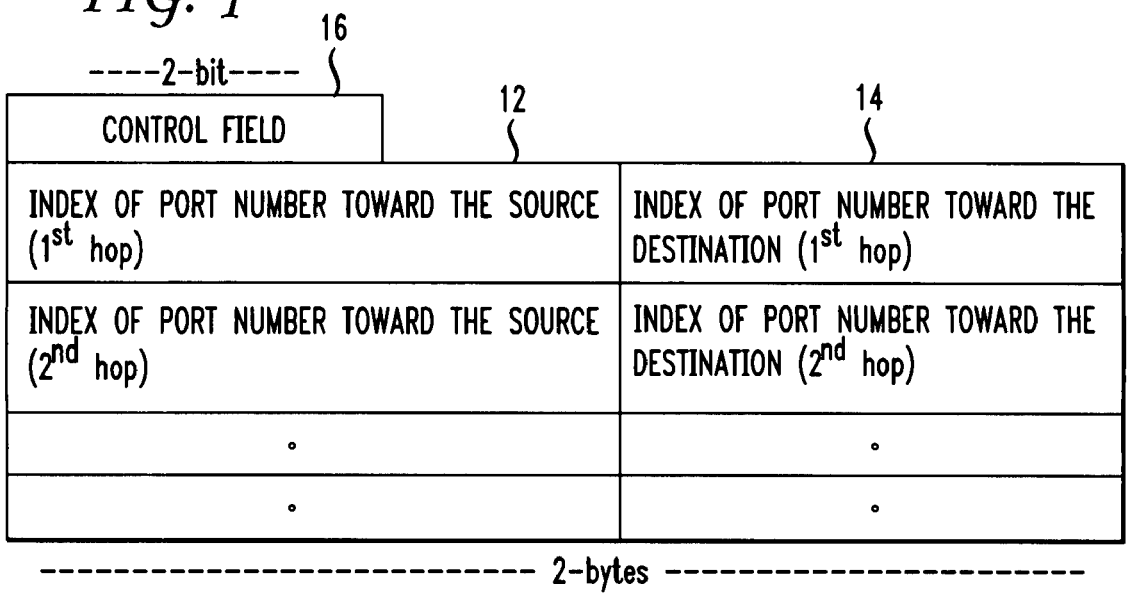
FIG. 2
| INDEX | NI Address |
|---|---|
| 1 | NI1 |
| 2 | NI2 |
| 3 | NI3 |
| ○ | ○ |
| ○ | ○ |
FIG. 3
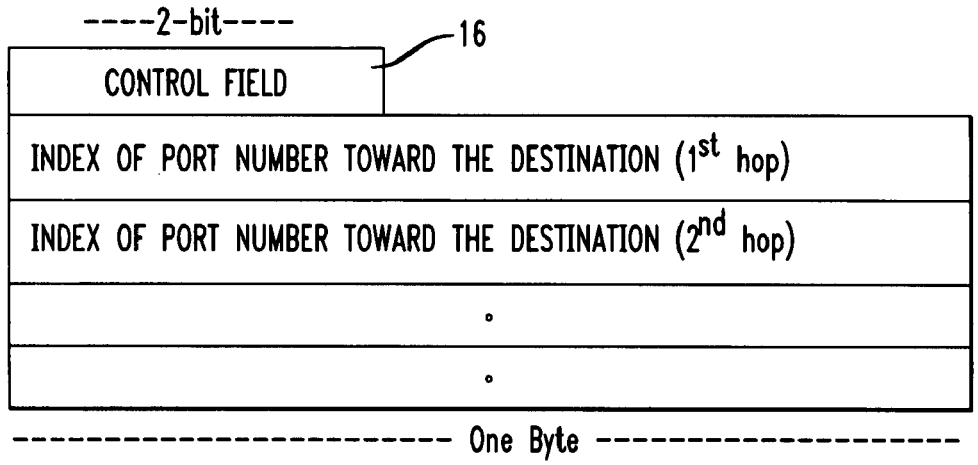

ROUTE ONCE AND CROSS-CONNECT MANY

CROSS-REFERENCE TO RELATED APPLICATION

This Application is related to Provisional Patent Application Ser. No. 60/850,590, filed on, Oct. 10, 2006, the disclosure of which is incorporated herein by reference.

FIELD OF THE INVENTION

The present invention relates generally to high-speed packet forwarding (switching/routing) system such as the present IP (Internet Protocol). More particularly, the invention encompasses a protocol that includes having the capabilities of high-speed IP packet forwarding to over come network delays. The invention further includes a protocol that allows for an easy and transparent implementation on current IP networks or any packet switching system/device so that one can route once (at a certain level) and cross-connect many (at a lower layer) (ROACM).

BACKGROUND INFORMATION

The increase of media-based applications on the Internet has incurred great cost on the routing infrastructure that is required to serve the content. Because of the increase of media-based applications the routers can be a major stumbling block for such Internet-powered media applications. As more and more users use the Internet the stress on the backbone, including the routers, increases. To overcome this and related problems research is being done to develop routing technologies that allow for scalability to cope with the current and future bandwidth hungry applications of the Internet. This also includes having the capabilities of high-speed IP packet forwarding to overcome the increasing network delays.

Furthermore, the increased traffic transfer through ISPs (Internet Service Providers) caused by new access methods, such as, for example, ADSL (Asymmetric Digital Subscriber Line) is a burden on routers, especially backbone routers.

Thus, there exists a need to speed up the routers.

Furthermore, there is also a need for a new protocol which will enable routing once and cross-connect to any packet switching system/device, such as, router.

Similarly, there is also a need for a new protocol which will enable routing once and cross-connect to many packet switching systems/devices, such as, routers.

Yet there is another need to have a simple protocol that allows for easy and transparent implementation on high speed networks, such as the current networks.

This invention overcomes the problems of the prior art. The invention provides a protocol to speed up the routers or any packet switching system/device by providing a new protocol which enables to route once and cross-connect many (ROACM).

PURPOSES AND SUMMARY OF THE INVENTION

The invention is a novel protocol for high-speed packet forwarding.

The invention is also a novel protocol for high-speed packet forwarding for any packet switching system/device.

Therefore, one purpose of this invention is to provide a high-speed IP (Internet Protocol) packet forwarding protocol.

Another purpose of this invention is to provide a protocol that includes having the capabilities of high-speed IP packet forwarding to over come network delays.

Yet another purpose of this invention is to provide a new protocol which will allow to route once and cross-connect (ROACM) to any packet switching system/device.

The present invention allows for speeding up the IP packet routing while going from a source to a destination. It is well known that while traveling from a source to a destination, most of the IP packets encounter different networking devices which have different network semantics (Network Interfaces (NIs)), such as, for example, packet forwarding routers, frame relay, MPLS (Multi-Protocol Label Switching), ATM (Asynchronous Transfer Mode), to name a few. This invention provides many benefits to routers or any packet switching system/device, especially, intelligent routers. With this invention the IP packet contains an extra or modified header that allows a dynamic virtual circuit to be created. This header contains all the relevant information to cross-connect the IP packets at the second layer (Data Link) or at any layer below the network layer.

In the call setup stage, the information is attached at the network layer header while in data transmission stage, the information is stored in the ROACM header (in the frame).

Propagation of ROACM information can occur below the IP level in networks that contain routers that all agree and support ROACM or implemented transparently by appending ROACM information to the end of an IP packet. ROACM itself maps virtual circuit links to take by providing a table containing either the hardware addresses of hops to take or IP.

This invention also allows inter-operability on a wide range of networks. This novel protocol has many advantages. It should be appreciated that the IP packet does not reach the network layer except in the call set-up stage. Also, there is no kind of search or routing/switching protocol distribution needed since all information is already encapsulated in the ROACM header at layer two. This also means that there is no need for high power processing in the routers. Moreover, with this invention packet reordering in the Internet can be eliminated. Public/private key encryption can be applied to ROACM to work-around blind spoofing attacks that common layer two protocols are susceptible to, such as, for example, Address Resolution Protocol (ARP).

Therefore, in one aspect this invention comprises a method of sending data packets between a source and a destination through one or more packet handling devices operable to forward packets through a communications network, comprising:

sending an establish connection packet from the source to a receiving packet handling device;

receiving the establish connection packet at the receiving packet handling device, the receiving packet handling device including a local router interface table having at least a source index corresponding to an address of a port connected towards the source and a destination index corresponding to an address of a port connected towards the destination;

adding index information to the establish connection packet at the receiving packet handling device, the added index information including at least:

the source index from the local router interface table stored in the receiving packet handling device corresponding to the port connected towards the source, and the destination index from the local router interface table stored in the receiving packet handling device corresponding to the port connected towards the destination;

thereafter, sending the establish connection packet towards the destination via the port connected towards the destination;

subsequently, repeating the steps of receiving the establish connection packet, adding index information to the establish connection packet from the local router interface table of the receiving packet handling device and sending the establish connection packet towards the destination until the establish connection packet arrives at the destination;

sending an acknowledge connection packet from the destination to the source and including with the acknowledge connection packet at least the source and destination indices added to the establish connection packet by each receiving packet handling device; and sending the data packets from the source to the destination, each data packet sent from the source including destination indices added to the establish connection packet by each receiving packet handling device.

In another aspect this invention comprises a packet handling device for forwarding data packets between a source and a destination through a communications network comprising:

a source port for connection towards the source;

a destination port for connection towards the destination;

a stored local router interface table, the local router interface table including at least:

a source index and corresponding source address, the source index corresponding to the source port; and a destination index and corresponding destination address, the destination index corresponding to the destination port;

the packet handling device identifying establish connection packets received through the source port;

the packet handling device adding index information from the stored local router interface table to each establish connection packet, the added index information including at least:

the source index from the local router interface table, and the destination index from the local router interface table;

thereafter, the packet handling device sending each establish connection packet towards the destination via the destination port;

the packet handling device identifying acknowledge connection packets received through the destination port, the acknowledge connection packets including source and destination indices added to the establish connection packet by other packet handling devices;

the packet handling device sending each acknowledge connection packet towards the source via the source port;

the packet handling device identifying data packets received through the source port; and the packet handling device sending each data packet towards the destination via the destination port.

BRIEF DESCRIPTION OF THE DRAWINGS

The features of the invention and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

FIG. 1, is an exemplary IP packet with an extra header which is used to illustrate one aspect of the present invention.

FIG. 2, illustrates a local router interface table according to one aspect of the present invention.

FIG. 3, is an exemplary ROACM Forward Header (to the destination) according to one aspect of the present invention.

DETAILED DESCRIPTION

Figure 4:
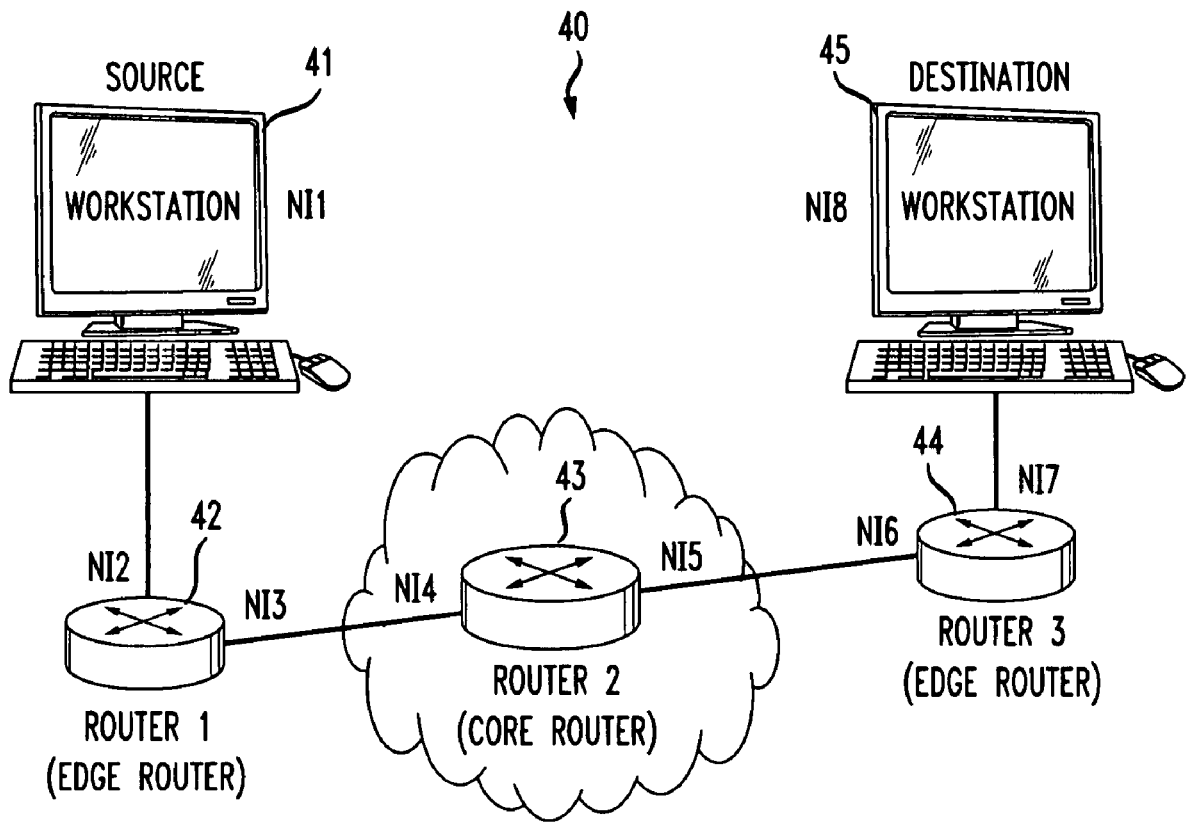
FIG. 4, is an exemplary network with three hops according to one aspect of the present invention.

The invention basically comprises four major operations. The first is the call set-up, the second is data transmission, the third is path update, and the fourth is the recovery plan.

As shown in FIG. 1 the inventive IP packet has an extra or modified header such that it has a static field and a dynamic field. The static (control) field 16, is used to establish connection/ACK connection/data transmission (typically 2-bit, but not limited thereto), where '01' means establish connection, '10' means ACK connection, and '11' means data transmission. The dynamic fields are typically pairs of two bytes in the header that contain the index port numbers for the source and the destination NI (Network Interface) addresses (next hop) one byte for each direction. In other words, each pair of these two bytes represents the information of the outgoing ports (NI addresses) for next hop (a router) for both directions. The more hops from a source to a destination, the more information, such as pairs of the two bytes are added to the header. This addition is only performed in a call set up stage with maximum of 255 hops. This maximum number can be changed if needed. In a data transmission stage, only one column in FIG. 1 plus the control field 16, are used according to the direction of the IP packet. Also, each router, in an IP packet's path, should have its local router interface table, which is stored locally.

As shown in FIG. 2 the table has two fields, the index field 22, and the NI address field 24. Thus, all the interfaces in a particular router will be listed in this local router interface table. This index's value will be stored in one byte of the pairs of the two bytes in the header as shown in FIG. 1. This is to avoid storing the NI address (for example MAC address is 48-bit) in the header. Having all this information in a ROACM header (in an IP packet) and the local router interface table at each router, a router will immediately check the relevant fields in both the ROACM header and the local router interface table and shunt the IP packet to the next hop. Thus, all IP packets going to the destination, routers do not need to check the IP address for each packet any more, but just pick up the index port number field located in the ROACM header, which is attached to all IP packets and immediately get the NI address corresponding to that index at the local router interface table and use the NI address to cross-connect all IP packets. Moreover, packet reordering in the Internet can be eliminated. This can be achieved by using the index in the header to associate it with a complete path through the router also identified as a packet handling device. This way packet reordering inside the router or packet handling device can be eliminated, thereby increasing the speed and reducing the delay in the network. Therefore, routers or packet handling devices, using this protocol, can cope with the enormously increased traffic.

At the set-up stage, the source workstation sets the establish connection/ACK connection/data transmission control field with value '01', which means establishing the connection. Therefore, a first regular IP packet will be sent to establish the connection and collect the information. When the IP packet reaches an edge router, this router or packet handling device searches for the destination IP address in the forwarding (or routing) table. The main aim of this search is to find the corresponding NI address for the next hop (router). Once it finds it, the router will use this information to forward the IP packet. A router should have a local router interface table that contains an indexed list that each index corresponds to an interface (NI address) connected to the router (this list is stored locally in each router) as shown in FIG. 2.

Therefore, the router or packet handling device adds this index port number in the header, as illustrated in FIG. 1, which corresponds to the NI address in the local router interface table (for example, the index value '5' instead of storing the NI address in the header, which in case of a MAC address, the NI consists of 48 bits) in the IP packet's extra header, specifically, in the right side byte of the first pair since it is the first hop toward the destination. Immediately after finishing the above process, the router gets the NI address for the opposite direction (Input Interface). This can be found in the destination physical address at the data link layer of the same packet, and stores the index port number in the IP packet's extra header, specifically in the left side byte of the first pair since it is the first hop from the source, as illustrated in FIG. 1. Thus, a pair of two bytes of information would belong to a particular router. This information is attached to the IP header in a call set-up while half-size of this information will be stored to the ROACM header in ACK connection and data transmission stages. The IP packet then moves to the next hop (enterprise or core router). At this router (the second hop), the router or packet handling device will repeat the same process again as the first router did. That is, the router finds the output NI address by searching the forwarding (or routing) table, and finds the Input NI address by getting it directly from the same incoming packet and gets their corresponding index port numbers from the local router interface table. After that, it will add these index port numbers in the IP packet's extra or modified header in the second pair of the two bytes. Finally, the router or packet handling device forwards the IP packet to the outgoing interface. This process will continue until the IP packet reaches the destination or edge router. Therefore, each pair of the two bytes represents the indexes of the corresponding network interfaces for a particular router in the IP packet path. One of these bytes is for the forward direction while the other is for the backward direction. In other words, the right side column 14 as shown in FIG. 1 is in the forwarding direction while the left side column 12, is for the backward direction. All information in FIG. 1 is stored in the source and the destination workstations.

When the IP packet goes in the forward direction, only the forward information and the control field are attached, as shown in FIG. 3, and when the IP packet goes in a backward direction, only the backward information and the control field are attached. Hence, half-size of the information is carried in the ROACM header. Thus, in the data transmission stage, the router will immediately look at this information to get the index numbers and find the corresponding NI addresses stored locally in each router in the IP packet path to move to a next hop. So, it forwards the IP packet without looking up in the cache (or routing) table. The source and the destination workstations are responsible to add the right information (forward/backward header) in the ROACM header (the information could be added at the edge routers), since the workstations (source and destination) keep a copy of the information, as illustrated in FIG. 1, where the ROACM header encapsulation starts. Also, the workstations (source and destination) keep a copy of their edge routers' MAC addresses, so that it can send the IP packet immediately.

By the time the first IP packet reaches the destination workstation, this IP packet has all information about the index port numbers as their NI addresses are stored locally in each router (hop) in the IP packet's path. This information is in the forward and the backward header. A copy of this information as stated earlier is kept in the destination workstation. The acknowledgment will be sent back to establish the connection (as specified by TCP/IP protocol), where a copy of the complete information is attached as a data to be stored in the source workstation. Before sending the IP packet back, the destination workstation sets the establish connection/ACK connection/data transmission control field with value '10', which means the IP packet is coming back with the header information as a data. Also, it uses only the backward header information in the ROACM header. The destination workstation then sends back the IP packet to the source workstation that contains the complete header information and the connection ACK. Therefore, the IP packet will be cross-connecting from the destination workstation to the source workstation.

Once the IP packet reaches the source workstation with value of '10' (ACK the connection), it knows that the data of this IP packet is in fact the complete header information, and the connection is established. A copy of this information should be stored in the source workstation. The source workstation will attach a copy of only the forward ROACM header information in each subsequent IP packet that it sends out to the destination with the control filed of value '11', which means data transmission. For all subsequent IP packets going to the destination workstation, routers do not need to check the IP addresses anymore nor they are performing switching, but only look at the index port number field in the ROACM header at each frame and immediately get the corresponding NI address, stored in the local router interface table and use it to cross-connect the IP packets. Thus, there is no routing or switching, but only cross-connecting.

After establishing the connection, data is transferred forth and back between the source and destination workstations. It is not necessary that this route continues to be the optimal path. In other words, if at time=$t_0$, when establishing the connection, the optimal route is stored in the ROACM header, but it is not necessary that the same is true at time=$t_1$. Thus, a periodic refresh message should be sent to update the preferable route.

If any output port malfunctions, the router would preferably send a message to the source workstation to stop sending any more IP packets and should re-establish the connection.

It is preferred that the header information is stored in the ROACM header in a stack fashion, i.e., Last In First Out (LIFO). Also, the control filed (2-bit) would be attached at the top of the stack.

Figure 5:
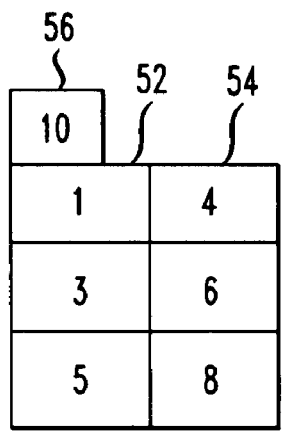
FIG. 5, illustrates an exemplary information header for the network of FIG. 4.
Figure 6A:
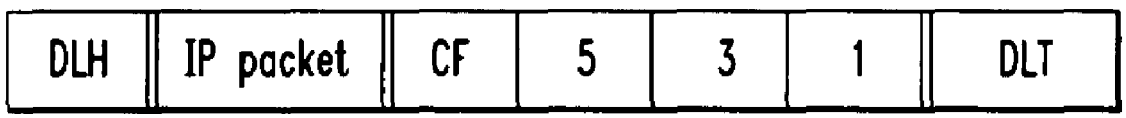
FIGS. 6A-6D, is an exemplary modification of a ROACM Header when moving from a destination to a source workstation according to one aspect of the present invention.
Figure 6B:
Figure 6C:
Figure 6D:

For the purposes of illustration as shown in FIG. 4 if a connection is established with three routers (hops), then the packet will have 6 bytes of header information (three for forward header information, right column 14 (FIG. 1), 54 (FIG. 5), with the values '4', '6', '8', and the other three for the backward, left column 12 (FIG. 1), 52 (FIG. 5), with the values '1', '3', '5') plus 2-bit control field header 16 (FIG. 1), 56 (FIG. 5) with the value '10', as illustrated in FIG. 5. The destination workstation or device 45, sends back the IP packet, which contains the header information as data. It encapsulates only the backward information and the control field in the ROACM header such that the first hop (1-byte) information, as shown in FIG. 5, is located at the last position in the stack and the last hop is at the top of the stack and after this there is the 2-bit control filed, as shown in FIG. 6A. In the Data Link Header (DLH), the Source MAC address (belongs to the workstation) and the Destination MAC address (belongs to the Ethernet router interface) are stored in the workstation for fast transmission, since the workstation knows its NI and also can have a copy of the router NI. Once the IP packet reaches router 44, it extracts and checks the 2-bit control field. If it has the value '10' or '11', it performs cross-connection. Since it is an ACK connection, the value must be '10'. Then, router 44, extracts the first byte (top of the stack), which has the index number of the NI address stored in the router 44. For the purposes of illustration the value is 5. The router then checks in the local router interface table for corresponding NI address towards the source workstation or device 41. This byte of header information will be discarded. Then router 44, encapsulates the new frame with the new (shrunk or modified) ROACM header, where one byte is dropped (the value '5'), and re-add only the 2-bit control field with same value '10', as shown in FIG. 6B. Therefore, one will have in the new ROACM header, only two bytes and again at the top of the stack is 2-bit control field. In the next hop, router 43, extracts and checks the first two bits and then the first byte and gets the corresponding NI address stored locally in the router 43. Again, router 43, will discard this byte of header information (the value '3') after finding the corresponding NI address, and adding back the 2-bit control field with same value at the top of the stack. After the new ROACM header is encapsulated with the current destination NI address, it will be sent for the next hop. In this case, only 2-bit and one byte are left for the last hop, as shown in FIG. 6C. The remaining byte is the index number for the NI address for the source workstation 41. At the last hop, router 42, does the same process that it extracts and checks the control field and the remaining one byte header. Then, router 42, gets the current NI address, discards the byte of header (the value '1', but will keep the control bit), and re-encapsulates the IP packet, as shown in FIG. 6D. Once the IP packet reaches the source workstation 41, it knows that this is the ACK for the connection, and store the information locally as illustrated in FIG. 1, and that it will use only the right column 14 (FIG. 1), for forwarding the subsequent IP packets as shown in FIG. 3.

After this, the workstation changes the value of the control field to '11', so that all routers and the destination workstation have information that it is the data transmission stage. Then, it encapsulates the right side column 14 (FIG. 1), 54 (FIG. 5), with the values '4','6','8', and put in the DLH its source MAC address and destination MAC address (belongs to the edge router), then it sends the IP packet to router 42, where the same process performed in the backward direction also will be employed for the forward direction until all data is transferred. It should be appreciated that ROACM implemented at the IP/network/transmission level can contain protocol-specific addresses rather than MAC/hardware addresses.

For some applications the IP packets may encounter a combination of different network devices such as routers, Frame Relay, MPLS, ATM switches, . . . etc. In Frame Relay Switches, the process would be the same as the routers, but in the ATM switches there is a change in the process. ATM uses cells where each cell consists of 48 bytes for the data and 5 bytes for the header. When the IP packet reaches an ingress ATM switch (node), it will be chopped off to many cells. In this case, the ATM switch should extract the ROACM header from the IP packet and attach the same ROACM to each cell belongs to that particular IP packet. Then the same process will be employed on the cells to collect the ROACM information (for ATM environment). Once the cells reaches the egress ATM switch where the IP packet reassembling takes place, then only one copy of the ROACM (in all cells would be the same) is inserted in the IP packet. In the coming back trip, and when the IP packet reached the ATM switch, only one copy is inserted into all cells, which belongs to that particular IP Packet. At the other end (ingress node) also one copy of the ROACM is inserted in the reassembled IP packet. Another option is to do nothing in the ATM environment.

Transparency can be provided without losing interoperability by appending the ROACM header to the IP packet (before the link-level protocol tail). As most firewalls/operating systems will ignore tail data (as it is usually treated as padding and similar), a packet will go up the operating system's TCP/IP stack and be processed as usual. The down-side of this model is that only paths containing ROACM support will be optimized.

The ROACM invention can be implemented not only on the routers, but also on any switching device, such as, for example, MPLS, Frame relay, ATM, or any other packet switching device, to name a few. Similarly, this invention can also work with a hybrid switching device.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of sending data packets between a source and a destination through one or more packet handling devices operable to forward packets through a communications network, comprising the steps of:
    sending an establish connection packet from the source to a receiving packet handling device;
    receiving the establish connection packet at the receiving packet handling device, the receiving packet handling device including a local router interface table having at least a source index corresponding to an address of a port connected towards the source and a destination index corresponding to an address of a port connected towards the destination;
    adding index information to the establish connection packet at the receiving packet handling device, the added index information including at least:
        the source index from the local router interface table stored in the receiving packet handling device corresponding to the port connected towards the source, and
        the destination index from the local router interface table stored in the receiving packet handling device corresponding to the port connected towards the destination;
    thereafter, sending the establish connection packet towards the destination via the port connected towards the destination;
    subsequently, repeating the steps of receiving the establish connection packet, adding index information to the establish connection packet from the local router interface table of the receiving packet handling device and sending the establish connection packet towards the destination until the establish connection packet arrives at the destination;

sending an acknowledge connection packet from the destination to the source and including with the acknowledge connection packet at least the source and destination indices added to the establish connection packet by each receiving packet handling device; and sending the data packets from the source to the destination, each data packet sent from the source including destination indices added to the establish connection packet by each receiving packet handling device.

2. The method of claim 1 wherein the establish connection packet, the acknowledge receipt packet and the data packets are any packet switching system.

3. The method of claim 1 wherein the data packets are IP packets and the destination indices added to the data packets are in the form of an additional header allowing cross connection ax a data link layer or any layer below a network layer.

4. The method of claim 1 wherein the index information added to the establish connection packet is attached at a network layer or at a switching system layer.

5. The method of claim 1 wherein the establish connection packet, the acknowledge receipt packet and the data packets include a control field identifying the packet as an establish connection packet, an acknowledge receipt packet or a data packet.

6. The method of claim 5 wherein the control field is at least two bits in length.

7. The method of claim 1 wherein the source and destination indices from each local router interface table are substantially shorter than the addresses of the ports connected towards the source and destination.

8. The method of claim 1 wherein before sending the data packet towards the destination each packet handling device removes the index corresponding to its own NI address and leaves other indices corresponding to other NI addresses of other packet handling devices.

9. The method of claim 1 wherein the data packets are IP protocol data packets or any packet switching system containing a modified header.

10. The method of claim 1 wherein the acknowledge receipt packets include indices information from stored local router interface tables of other packet handling devices sufficient to create a dynamic virtual circuit and cross-connect packets at a second level data link layer or below a network layer.

11. The method of claim 1 wherein the establish connection packets are IP protocol establish connection packets at a network layer or at a switching system layer containing a modified header.

12. A packet handling device for forwarding data packets between a source and a destination through a communications network comprising:

a source port for connection towards the source;

a destination port for connection towards the destination;

a stored local router interface table, the local router interface table including at least:

a source index and corresponding source address, the source index corresponding to the source port; and a destination index and corresponding destination address, the destination index corresponding to the destination port;

the packet handling device identifying establish connection packets received through the source port;

the packet handling device adding index information from the stored local router interface table to each establish connection packet, the added index information including at least:

the source index from the local router interface table, and the destination index from the local router interface table;

thereafter, the packet handling device sending each establish connection packet towards the destination via the destination port;

the packet handling device identifying acknowledge connection packets received through the destination port, the acknowledge connection packets including source and destination indices added to the establish connection packet by other packet handling devices;

the packet handling device sending each acknowledge connection packet towards the source via the source port;

the packet handling device identifying data packets received through the source port; and the packet handling device sending each data packet towards the destination via the destination port.

13. The packet handling device according to claim 12 wherein:

the packet handling device further includes additional ports;

the local router interface table includes additional port index numbers and port addresses corresponding to the additional ports;

each data packet includes a header containing an index in the packet handling device's local router interface table;

the packet handling device reads the header of each data packet to identify the index in the packet handling device's local router interface table;

the packet handling device uses the index from the header of each data packet and determines from the local router interface table the corresponding port and address for sending each data packet; and before sending each data packet, the packet handling device removes the index from the header of each data packet corresponding to the local router interface table of the packet handling device and leaves any other indices in the header of each data packet corresponding to other local router interface table of other packet handling devices.

14. The packet handling device according to claim 12 wherein the packet handling device is an IP protocol router handling data packets having an extra header containing index information from stored local router interface table of other packet handling devices.

15. The packet handling device according to claim 12 wherein the packet handling device is an IF protocol router handling acknowledge receipt packets having an extra header, the acknowledge receipt packets having associated index information from stored local router interface table of other packet handling devices sufficient to create a dynamic virtual circuit and cross-connect packets at a second level data link layer or below a network layer.

16. The packet handling device according to claim 12 wherein the packet handling device is an IP protocol router handling establish connection packets having a modified header at a network layer or at a switching system layer.

17. The packet handling device according to claim 12 wherein the packet handling device avoids packet reordering by using indices in received packets to look up an associated port in the local router interface table of the packet handling device.

18. The packet handling device according to claim 12 wherein the each packet includes a control field identifying the packet as the establish connection packet, the acknowledge connection packet or the data packet, and the packet handling device reads the control field of each packet to identify packet as an establish connection packet, an acknowledge connection packet or a data packet.

19. The packet handling device according to claim 18 wherein the control field is at least two bits in length.

20. The packet handling device according to claim 12 wherein the indices in the local router interface table are substantially shorter than the addresses in the local router interface table.

* * * * *